(12) United States Patent
Kowalski et al.

(10) Patent No.: US 10,315,059 B2
(45) Date of Patent: Jun. 11, 2019

(54) BACK PRESSURE FLAP VALVE ARRANGEMENT AND THE USE THEREOF

(71) Applicant: Nederman Holding AB, Helsingborg (SE)

(72) Inventors: Bartosz Kowalski, Warsaw (PL); Jacek Czyzewski, Gdansk (PL); Christian Norman, Furulund (SE); Klaus Bihlet, Randers NÖ (DK)

(73) Assignee: NEDERMAN HOLDING AB, Helsingborg (SE)

( * ) Notice: Subject to any disclaimer, the term of this patent is extended or adjusted under 35 U.S.C. 154(b) by 0 days.

(21) Appl. No.: 15/854,233

(22) Filed: Dec. 26, 2017

(65) Prior Publication Data

US 2018/0185680 A1    Jul. 5, 2018

(30) Foreign Application Priority Data

Dec. 28, 2016 (EP) .................................... 16207118

(51) Int. Cl.
*A62C 2/12* (2006.01)
*A62C 4/02* (2006.01)
(Continued)

(52) U.S. Cl.
CPC .................. *A62C 2/12* (2013.01); *A62C 4/02* (2013.01); *F16K 15/03* (2013.01); *F16K 17/164* (2013.01); *F16K 17/34* (2013.01); *B01D 46/0093* (2013.01)

(58) Field of Classification Search
CPC ........... A62C 2/12; A62C 3/0285; A62C 4/00; A62C 19/00; A62C 3/04; A62C 13/006; A62C 3/0214; A62C 13/12; F24F 11/33
(Continued)

(56) References Cited

U.S. PATENT DOCUMENTS

| 4,738,189 A * | 4/1988 | White ................... A62C 2/248 454/369 |
| 2012/0048399 A1 | 3/2012 | Zellweger et al. |
| 2015/0132071 A1 | 5/2015 | Wolf et al. |

FOREIGN PATENT DOCUMENTS

| EP | 3021020 A1 | 5/2016 |
| GB | 2208427 A | 3/1989 |

OTHER PUBLICATIONS

Extended European Search Report dated Apr. 28, 2017, 5 pages.

* cited by examiner

*Primary Examiner* — Gregory L Huson
*Assistant Examiner* — Ryan L Faulkner
(74) *Attorney, Agent, or Firm* — Brundidge & Stanger, P.C.

(57) ABSTRACT

A back pressure flap valve arrangement is disclosed. The arrangement comprises a housing (101) having an inlet opening (102) and an outlet opening (103) adapted for connection of the housing (101) to a ducting (200), and at least one side wall (104) extending along a flow direction through the housing (101) from the inlet opening (102) to the outlet opening (103). A flap (1) is pivotably hinged about a shaft (5) thereby being movable between an open position and a closed position, said shaft (5) extending transverse the flow direction. At least one locking device (10) is fixedly mounted to the side wall (104) and comprises a locking pin (14) and a stopping member (12). The locking pin (14) is movable between a retracted position and a locking position, and being biased towards said locking position. The stopping member (12) is movable from a stop position in which the stopping member (12) is adapted to hold the locking pin (14) in its retracted position, to a release position by the flap (1) acting on the stopping member (12) in case of a back pressure. Thereby the locking pin (14) is allowed to move (Continued)

into the locking position in which the locking pin (14) maintains the flap (1) in the closed position.

13 Claims, 5 Drawing Sheets

(51) Int. Cl.
 *F16K 15/03* (2006.01)
 *F16K 17/164* (2006.01)
 *F16K 17/34* (2006.01)
 *B01D 46/00* (2006.01)
(58) Field of Classification Search
 USPC ............... 454/257, 269, 169, 342, 357, 369
 See application file for complete search history.

BACK PRESSURE FLAP VALVE ARRANGEMENT AND THE USE THEREOF

FIELD OF THE INVENTION

The present invention relates to a back pressure flap valve arrangement and the use of such back pressure flap valve arrangement in a ducting intended to conduct a dust or particle laden gas flow.

BACKGROUND OF THE INVENTION

It is well known to collect dust particles and other particulate material in containers or the like for later disposal or use. The containers may be provided with an air filter system. The material may be supplied to the containers by means of a gaseous flow through a ducting. The dust may be explosive. In some situations, an ignition may occur in the container due to ignition sources transported to the container with the airflow or due to ignition sources inside the container. Such ignition may result in devastating effects both on personnel, buildings, and the equipment, since the ignition may cause an explosion with a pressure wave and a flame front which propagates along the ducting opposite to the normal airflow direction.

In order of preventing such pressure wave and flame front from travelling back along the ducting, it is well known to provide a back pressure flap valve arrangement in the ducting. The back pressure flap valve arrangement typically comprises a flap which is arranged to act as a check valve which may close off the ducting. During normal operation the flap is maintained in an open position by the dust or particle laden air stream flowing along the ducting. In the occasion of sudden pressure wave resulting from an upstream explosion, the flap is arranged to close the passage through the ducting by the pressure wave acting on the flap. To avoid any rebound of the flap it is known to use a locking mechanism. One such locking mechanism is known from e.g. DE 202009011668U1.

Regulations require solutions where the flap stays closed long enough to avoid flames from transmitting during an explosion event, see European Standard BS EN 16447:2014 with the title Explosion isolation flap valves. The standard stipulates that the parts making up the flap valve should be designed such that it can withstand the loads imposed by any explosion that can be expected in accordance with its intended use without losing its ability to perform its safety function.

The loads imposed by an explosion may be very high, whereby the flap and its locking mechanism must be designed to meet such loads. Still, the design must not interfere with the normal functionality of the ducting and the flap.

SUMMARY OF THE INVENTION

It is an object of the present invention to provide a back pressure flap valve arrangement which allows an instantaneous closing off of the ducting in case of an adverse pressure wave exceeding a predetermined force.

The back pressure flap valve arrangement should not allow any rebound of the flap in case of such pressure wave.

Especially, the invention refers to a back pressure flap valve arrangement comprising a housing having an inlet opening and an outlet opening adapted for connection of the housing to a ducting, and at least one side wall extending along a flow direction through the housing from the inlet opening to the outlet opening, the arrangement further comprising a flap which is pivotably hinged about a shaft thereby being movable between an open position and a closed position, said shaft extending transverse the flow direction. The arrangement further comprises at least one locking device being fixedly mounted to the side wall and comprising a locking pin and a stopping member, said locking pin being movable between a retracted position and a locking position, and being biased towards said locking position, and the stopping member being movable from a stop position in which the stopping member is adapted to hold the locking pin in its retracted position, to a release position by the flap acting on the stopping member in case of a back pressure, thereby allowing the locking pin to move into the locking position in which the locking pin maintains the flap in the closed position.

By the inventive back pressure flap valve arrangement, a solution is provided that allows an instant and complete closing-off of the ducting in case a back pressure should occur. The locking device is activated by the flap, provided the kinetic energy caused by a back pressure is high enough to overcome the releasing force required to release the engagement between the stopping member and the locking pin. The required releasing force is determined by a combination of friction between the locking pin and the stopping member and also the biasing force of the locking pin.

In the released condition, the flap is held and maintained in a position between the closed-off inlet opening and the locking pin. The closing-off is maintained until a resetting is actively made. Thus, the closing-off is not the result of any kinetic energy being absorbed by components deforming but rather a controlled mechanical interlocking between mutually movable parts. Accordingly, after a release, the locking device may be reset and reused.

The ducting may comprise a flexible sealing arranged in a position between the inlet opening and the flap, which flexible sealing must be at least partly compressed by the pivoting of the flap for the flap to be able to act on the stopping member. By such mandatory compression of the flexible sealing before allowing the flap to engage and operate the locking device, the arrangement safeguards the locking device from releasing due normal pivoting of the flap caused by gravity, which will be the case in e.g. a stand-still of fans used in the ducting. Also, the additional advantage is achieved that the flexible sealing allows sealing for backdraft of dust during a fan stand-still without the risk of the locking device being activated. Also, should any explosion occur during a fan stand-still, the flexible sealing may be compressed to such extent that the locking device may be activated by the flap.

A radial gap may be formed between the flexible sealing and the inlet opening of the ducting. The radial gap allows accommodation of the deformation of the flexible sealing that results when the same is compressed by the flap. Thereby the flexible sealing will be prevented from being cut by the flap compressing it against the edge of the inlet duct.

The stopping member may be movable from the stop position to the release position by the stopping member being arranged to pivot around a pivot, said pivot having a longitudinal extension essentially in parallel with the surface extension of the flap as seen in a position when the flap has pivoted to its closed position in case of a back pressure. By the pivot extending essentially in parallel with the surface extension of the flap, the risk of the pivot being deformed, e.g. distorted by the flap, is reduced.

The stopping member may comprise a stop face having a surface extension essentially in parallel with the surface extension of the flap as seen in a position when the flap has pivoted to its closed position, and wherein the flap, in case of a back pressure, is arranged to act on said stop face thereby moving the stopping member from its stop position to its release position. By the stop face of the stopping member extending essentially in parallel with the surface extension of the flap, the risk of the stop face and also the pivot of the stopping member being deformed by the flap is reduced.

The stopping member may comprise a shoulder arranged to engage the locking pin when the locking pin is held in its retracted position. The shoulder preferably comprises an abutment surface extending transverse the longitudinal axis of the locking pin.

The flap may comprise a stiffener, and the locking pin may be adapted to abut said stiffener in a condition when the flap has been pivoted to its closed position. The stiffener reduces the risk of the flap being deformed, e.g. by being crooked by a back pressure. Even though the flap, which typically is made of sheet metal, should be crooked due to the high forces caused by a back pressure, it is most likely that the stiffener as such will remain its geometry. Thus, by arranging the locking pin to abut and engage the stiffener, the risk of a failed locking effect is substantially reduced.

The locking device may further comprise a base plate via which the locking device is fixedly mounted to a side wall of the housing, wherein the locking pin is arranged to extend from a first side of the base plate, via a through hole in the base plate, to a second side of the base plate, and wherein the locking pin is biased towards the locking position by an elastic member being supported by the portion of the locking pin extending on the second side of the base plate.

The locking pin may be arranged to be set from the locking position to the retracted position by pulling the locking pin, thereby overcoming the biasing, and while pulling the locking pin, moving the stopping member from its release position to its stop position.

The locking device may further comprise a resetting member, said resetting member comprising a resetting pin extending from the first side of the base plate, via a through hole in the base plate, to the second side of the base plate, and whereby the stopping member is arranged to be moved from its release position to its stop position by pushing the resetting member towards the stopping member.

The resetting member may be biased towards the first side of the base plate.

The shaft may be rotatably suspended in two opposing side walls of the housing, and the suspension may be made via two long holes arranged in the respective side walls. By the long holes, the installation is facilitated by allowing an adjustment of the distance between the flap and the duct opening as seen in the longitudinal extension of the ducting.

The flap may be further pivotably hinged along a pivot extending in parallel with the shaft, said pivot being arranged to extend across the surface extension of the flap. By the flap being pivotably hinged around two pivots the arrangement will be less sensitive to any misalignments and tolerances between the position of the arrangement and the duct to be closed-off by the flap.

According to another aspect, the invention relates to the use of a back pressure flap valve arrangement with the features as given above in a ducting intended to conduct a dust or particulate laden gas flow.

It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein. Rather, these embodiments are provided for thoroughness and completeness, and fully convey the scope of the invention to the skilled person.

Figure 1:
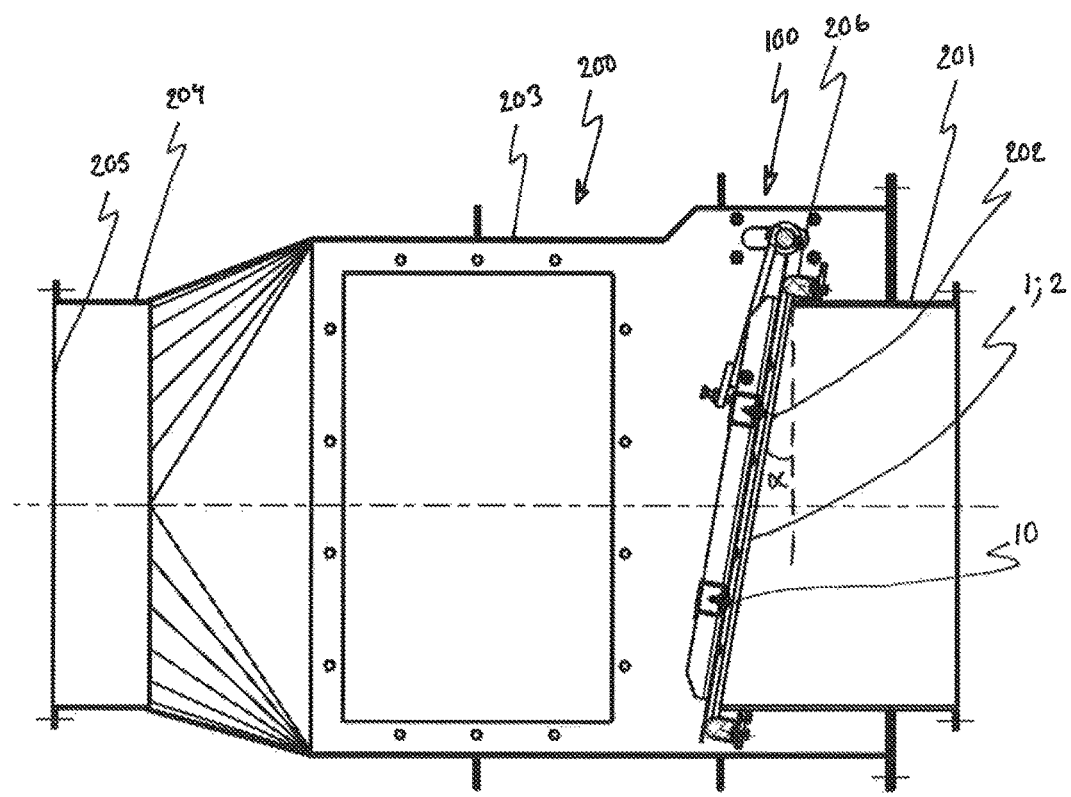
FIG. 1 discloses the back pressure flap valve arrangement as arranged in a ducting with the flap set to a closed position.
Figure 2:
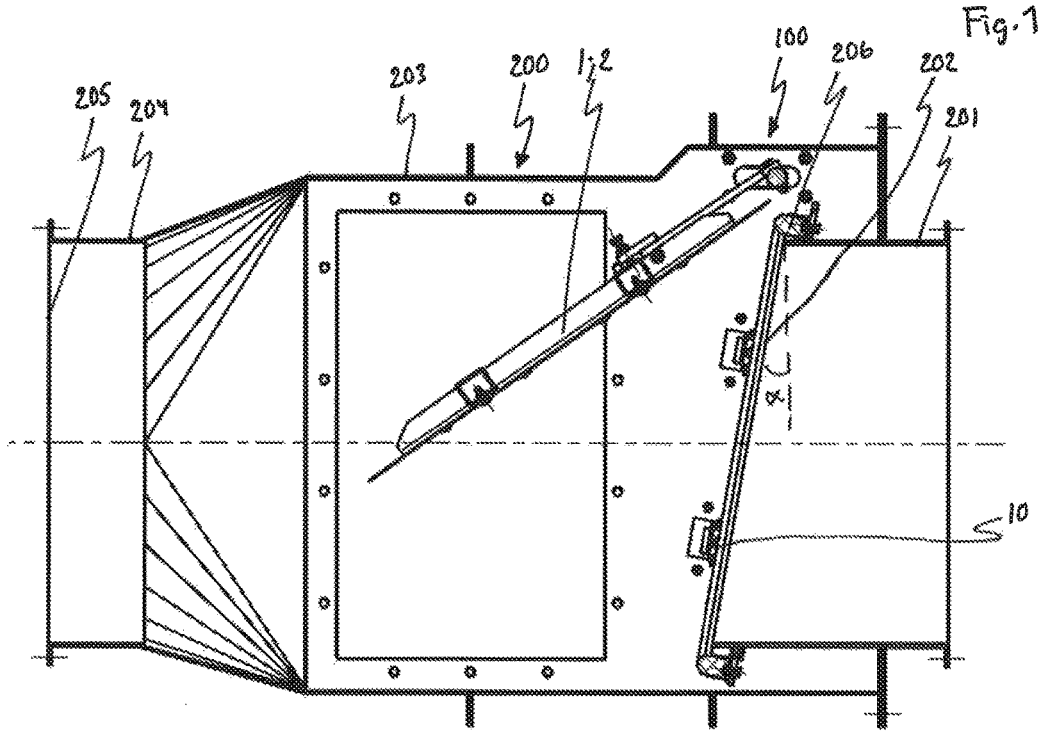
FIG. 2 discloses the back pressure flap valve arrangement as arranged in a ducting with the flap set to an open position.

Referring to FIGS. 1 and 2 one example of a back pressure flap valve arrangement 100 according to the invention is disclosed as arranged in a ducting 200. To avoid undue repetition, the back pressure flap valve arrangement 100 will in the following be referred to as "the arrangement". During normal operation, the flap 1 of the flap valve 2 is arranged to pivot between a closed position, see FIG. 1, in which the flap 1 closes-off the ducting 200, and an open position, see FIG. 2 in which a flow is allowed through the ducting 200.

The ducting 200 comprises starting from the right side a first duct portion 201 forming an inlet opening 202. The inlet opening 202 is chamfered and forms a downwardly directed acute angle α of 3-40° in view of a vertical plane and more preferred an angle of 10-30°. The first duct portion 201 extends into a chamber 203. The chamber 203 is at least partly formed by the arrangement 100 to be described in detail below. The chamber 203 has a longitudinal extension as seen along the longitudinal extension of the ducting 200 to allow pivoting of the flap 1 between the open and the closed position. A second duct portion 204 is mounted to the chamber 203. The second duct portion 204 forms an outlet opening 205.

The arrangement 100 is connected to the ducting 200 in a position before, i.e. upstream, a container (not disclosed) such that normal process flow is arranged to pass from the inlet opening 202 through the flap valve 2 before it reaches the container. The container is adapted to receive a dust or particle laden fluid flow to be fed along the ducting 200 from the inlet opening 202 to the outlet opening 205.

Figure 3:
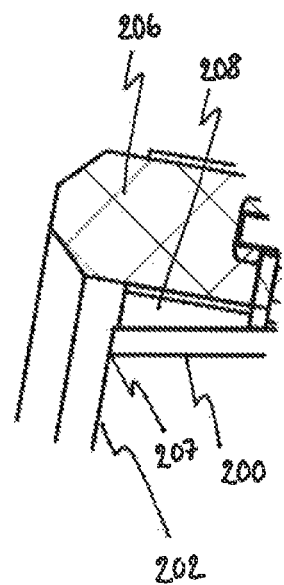
FIG. 3 discloses a portion of the flexible sealing.

As is seen in FIGS. 1, 2 and 3, a flexible sealing 206 is arranged to encircle the inlet opening 202 of the ducting 200. The flexible sealing 206 is arranged to extend past the free edge 207 of the inlet opening 202. Also, the flexible sealing 206 is arranged with a radial gap 208 between the flexible sealing 206 and the inlet opening 202.

During normal operation, the flap 1 is allowed to pivot between the open position of FIG. 2 and the closed position of FIG. 1 depending on the operation of fans (not disclosed) that are included in the ducting 200. During normal operation, the fans generate an air-flow which is sufficiently strong to overcome the gravity and thereby pivot the flap 1 to its open position. Should the fans be turned off, the flap 1 will pivot by gravity to its closed position in which the flap 1 loosely abuts the flexible sealing 206 encircling the inlet opening 202 and hence temporarily closes off the inlet opening 202. The flexible sealing 206 preferably exhibits an inherent stiffness that can resist the weight of the flap without any substantial deformation. In one embodiment, the flexible sealing 206 is dimensioned to require a deformation of at least 6 mm as seen in the longitudinal direction of the ducting in order for the flap 1 to come in contact with and operate the locking device 10. The skilled person will understand that the required deformation is the result of a combination of parameters such as geometry and material properties of the flexible sealing and weight and dimensions of the flap. Thus, the exemplified deformation of 6 mm should be seen as a non-limiting example allowing the locking device 10 to be activated both during operation with airflow and during a fan stand-still.

Should a back pressure occur upstream in the ducting 200, a pressure wave will be generated. Such pressure wave will close the flap valve 2 and prevent flames and sparks from propagating past the flap valve 2. This is of special importance in case of an explosion where flames and sparks may be generated and works in praxis as the pressure wave arrive first. Accordingly, in the event of a back pressure, the arrangement 100 should be set to a locking position in which the flap valve 2 immediately is set to close-off the inlet opening 202 and further is maintained in such position by a locking device 10 to be described below. As the flap 1 is moved to the locked position, the flexible sealing 206 is compressed. The deformation of the flexible sealing 206 will be accommodated by the radial gap 208 that is arranged between the flexible sealing 206 and the inlet duct 202. By the deformation of the flexible sealing being allowed to be accommodated in the radial gap 208, the flexible sealing is protected from being cut by the flap compressing it against the edge of the inlet duct 202. The locking device 10 may be activated both during operation with airflow and during a fan stand-still since a pressure wave generated during a pack pressure may be strong enough to compress the flexible sealing 206 to such extent that the flap 1 may come in contact with and operate the locking device 10.

Figure 4:
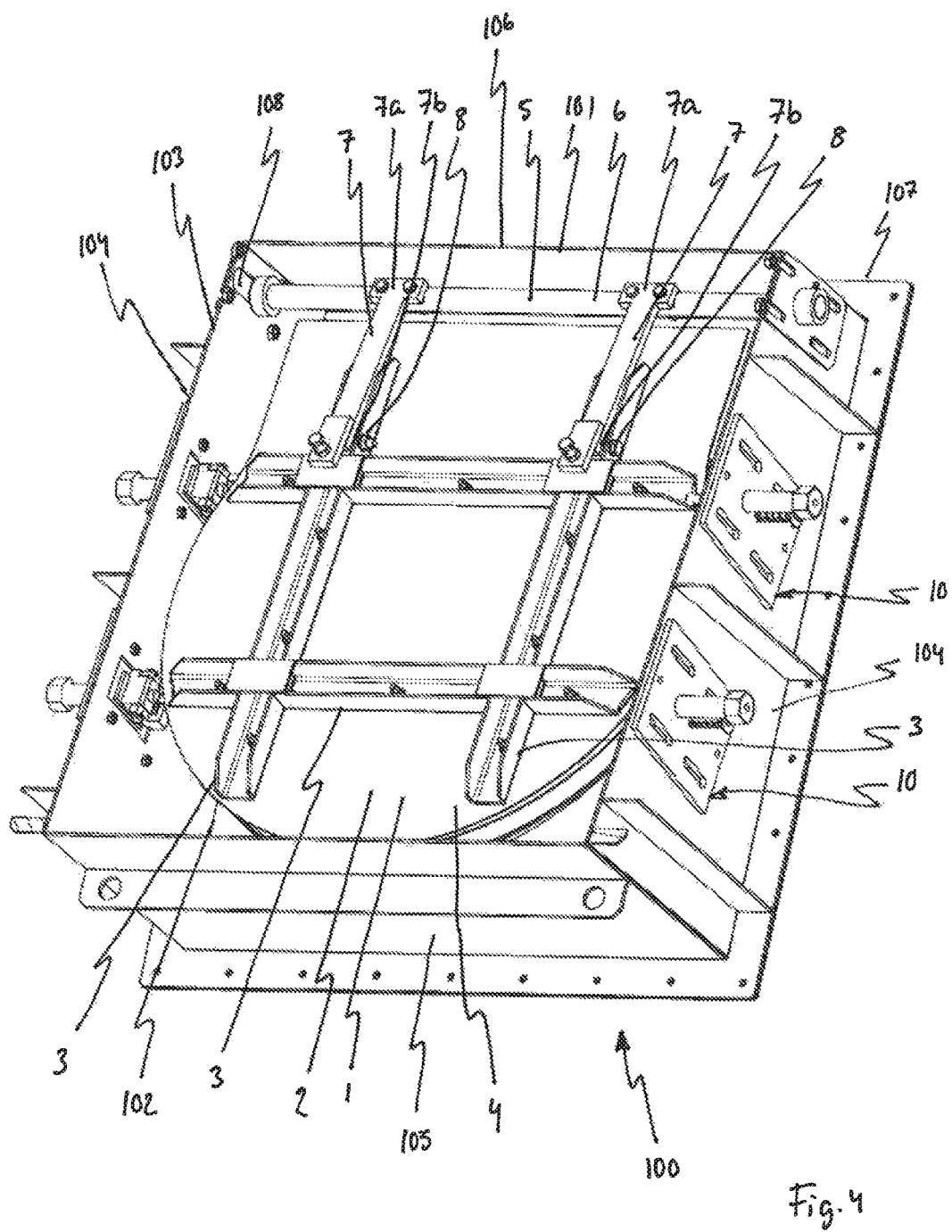
FIG. 4 discloses the arrangement.

Now turning to FIG. 4 the arrangement 100 according to the invention is disclosed. The arrangement 100 comprises a housing 101 having an inlet opening 102 and an outlet opening 103. The inlet and outlet openings 102, 103 are adapted for connection of the housing 101 to the ducting 200. The housing 101 comprises two opposing side walls 104, one bottom wall 105 and one top wall 106. The housing 101 is encircled by a flange 107 allowing the housing 101 to be mounted to the ducting 200.

The arrangement 100 comprises the flap valve 2 which as such comprises the flap 1. The flap 1 is formed by a thin walled, essentially flat plate 4 having a surface extension that exceeds the cross sectional area delimited by the flexible sealing 206. The flap 1 comprises stiffeners 3. The stiffeners 3 are arranged on the surface intended to face away from the inlet opening 202. In the enclosed embodiment the stiffeners 3 are formed by U-shaped profiles mounted to the flap 1. It is to be understood that other geometries are possible. The mounting is preferably made by bolting, thereby allowing easy replacement of the flap 1. As an alternative to bolting, the stiffeners 3 can e.g. be welded to the flap 1. It is to be understood that the stiffeners 3 as such may be omitted. In the latter case the plate 4 making up the flap 1 should have a thickness sufficient to withstand a back pressure.

Figure 5:
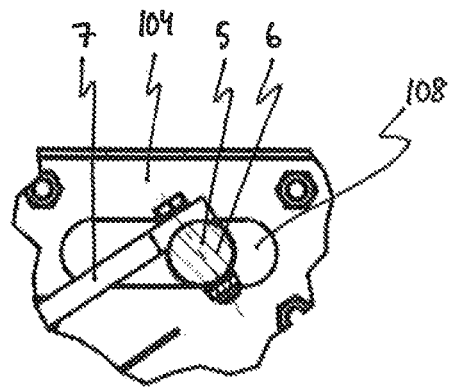
FIG. 5 discloses the long hole in the side wall of the housing.

The flap 1 is pivotably hinged about a shaft 5. The shaft 5 is pivotably suspended in the two opposing side walls 104 of the housing 101 and extends transverse the flow direction through the ducting 200. The suspension of the shaft 5 is made by each side wall 104 comprising a long hole 108, see also FIG. 5, into which the free ends of the shaft 5 are received. The shaft 5 is movably received inside and along said long holes 108 in order to account for dimensional tolerances regarding the position of the inlet opening 202 of the first duct 201 in view of the arrangement 100. As a proper position has been found during installation of the arrangement 100, the position is fixated. In the fixed condition, the shaft 5 together with the flap 1 may pivot around the longitudinal extension of the shaft 5 by means of bearings (not disclosed). The shaft 5 thereby constitutes a first pivot 6.

The flap 1 is fixed to the shaft 5 via two struts 7. A first end 7a of the respective strut 7 is fixedly mounted to the shaft 5 and hence to the first pivot 6. The second end 7b of the respective strut 7 projecting away from the shaft 5 is pivotably mounted to the flap 1 via one of the stiffeners 3, thereby forming a second pivot 8. In the disclosed embodiment the second pivot 8 is formed by the second end of the strut 7b being interconnected to the stiffener 3 by a bolt extending between the two opposing legs of the U-formed stiffener 3.

By the flap 1 being pivotably hinged around the two pivots 6, 8 the arrangement 100 will be less sensitive to any misalignments and tolerances between the position of the arrangement 100 in view of the inlet opening 202 to be closed-off by the flap 1.

In the above exemplified solution, the flap 1 is indirectly connected to the shaft 5 via the struts 7. Should the flap 1 be deformed during a back pressure to such extent that it needs to be replaced, the flap 1 may be dismounted from the struts 7, without the need of changing the position of the shaft 5 in view of the respective long holes 108.

Figure 6A:
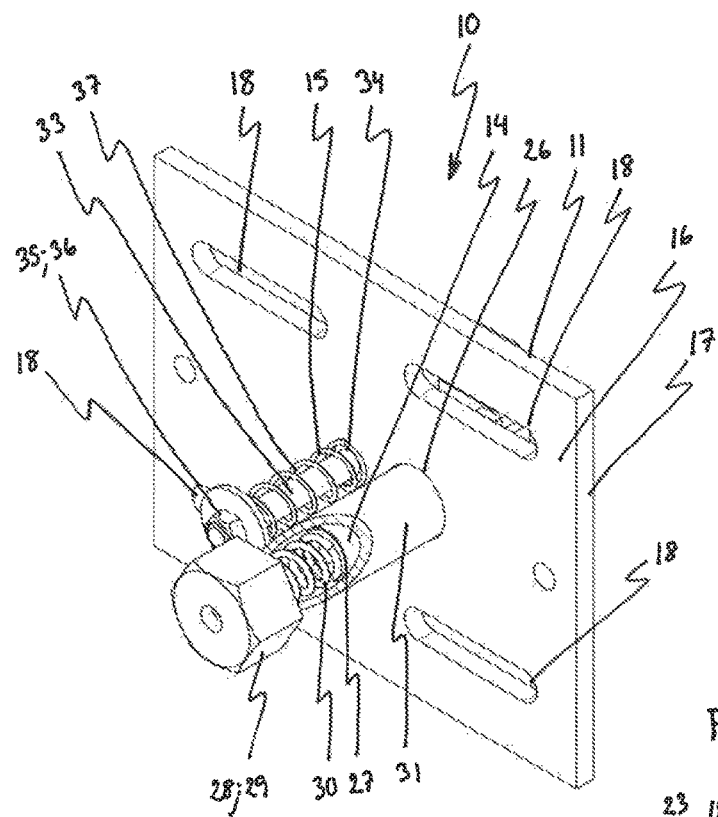
FIGS. 6a and 6b disclose one embodiment of the locking device.
Figure 6B:
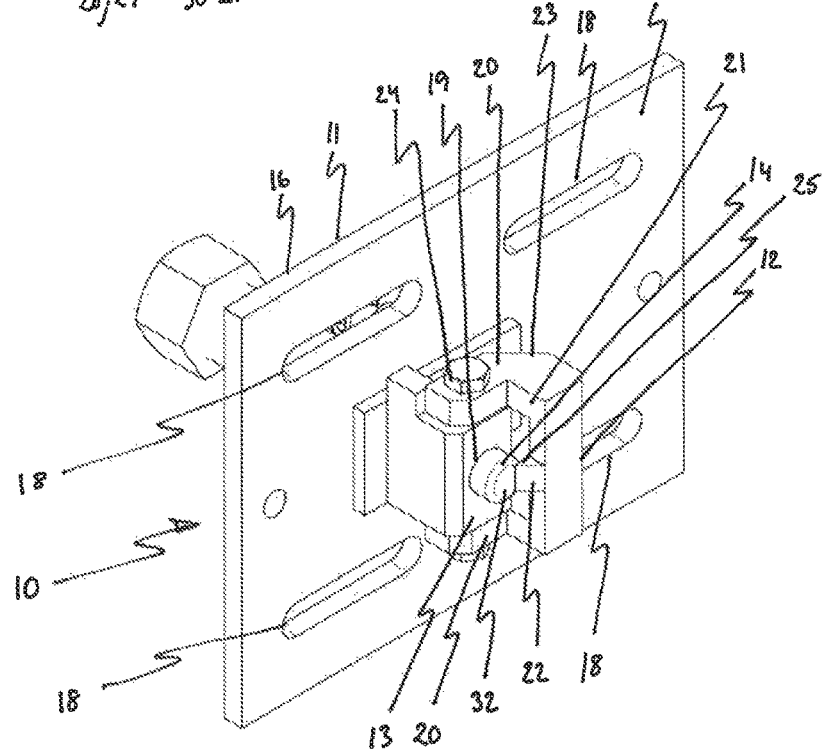

The disclosed arrangement 100 comprises four locking devices 10—two locking devices 10 on each exterior side wall 104 of the housing 101. The locking devices 10 are aligned with the longitudinal extension of two stiffeners 3. Now turning to FIGS. 6a and 6b, the locking device 10 is disclosed. The locking device 10 comprises a base plate 11, a stopping member 12, a guide member 13, a locking pin 14 and a resetting member 15.

The base plate 11 has a first side 16 adapted to face away from the housing 101 and a second side 17 adapted to face the housing 101. The base plate 11 has a rectangular form. It is to be understood that other geometries are possible with remained function. The base plate 11 comprises four through long holes 18 constituting mounting holes to be used when fixating the locking device 10 to the exterior side wall 104 of the housing 101. The long holes 18 facilitate adjustment of the position of the locking device 10 in view of the flap 1 of the arrangement 100 before fixation.

The guide member 13 and the stopping member 12 are arranged on the second side 17 of the base plate 11. The guide member 13 is fixedly mounted to the base plate 11 and comprises a body having a through hole 19 extending perpendicular to the extension plane of the base plate 11. The through hole 19 is adapted to receive and guide a portion of the locking pin 14 to be discussed below.

The stopping member 12 is formed as a body comprising on a first side thereof two legs 20, a stop face 21 and a shoulder 22 and on a second, opposite side thereof, a resetting surface 23. The two legs 20 project essentially perpendicular to the stop face 21. Each leg 20 comprises a through hole 24 extending essentially in parallel with the extension plane of the base plate 11. The stop face 21 is an essentially flat surface. The shoulder 22 projects from the stop face 21 and comprises an abutment surface 25 extending essentially in parallel with the extension of the two legs 20.

The stopping member 12 is pivotably mounted to the guide member 13 by means of two bolts extending through the holes in the legs 20 and into the guide member 13. The bolts form a pivot allowing the stopping member 12 to be pivoted in view of the guide member 13 between a stop position and a release position. When set to the stop position, the abutment surface 25 of the shoulder 22 is arranged to extend substantially perpendicular to the longitudinal center axis of the through hole 19 of the guide member 13. The resetting surface 23 of the stopping member 12 is formed as a beveled surface facing the base plate 11. The resetting surface 23 is arranged to interact with the resetting member 15 to be described below.

The locking device 10 comprises a locking pin 14. The locking pin 14 is arranged to extend from the first side 16 of the base plate 11, via a through hole 26 therein, to the second side 17 of the base plate 11. A first end 27 of the locking pin 14, i.e. the end facing away from the first side 16 of the base plate 11 comprises a hole (not shown) extending in the longitudinal direction of the locking pin 14. The hole receives a screw 28 with a head 29. An elastic member 30, in the disclosed embodiment in the form of a coil spring, is received in the interspace between the first end 27 of the locking pin 14 and the head 29 of the screw 28. The first end 27 of the locking pin 14 and the elastic member 30 are encapsulated inside a protecting tube 31. The second end 32 of the locking pin 14, i.e. the end projecting from the second side 17 of the base plate 11, is arranged to abut the shoulder 22 of the stopping member 12 in a condition when the stopping member 12 is set to its stop position. At least a portion of the locking pin 14 that projects on the second side 17 of the base plate 11 is guided by the through hole 19 in the guide member 13. The locking pin 14 is movable between a locking position and a retracted position. The locking pin 14 is biased towards the locking position by the elastic member 30.

The locking device 10 further comprises a resetting member 15. The resetting member 15 is arranged on the first side 16 of the base plate 11. The resetting member 15 comprises a resetting pin 33 that extends from the first side 16 of the base plate 11, via a through hole 34 therein, to the second side 17 of the base plate 11. A first end 35 of the resetting pin 33 that faces away from the first side 16 of the base plate 11 is mounted to an anvil 36. An elastic member 37, in the form of a coil spring is arranged to encircle the resetting pin 33. The elastic member 37 is biased between the anvil 36 and the base plate 11, in a direction away from the first side 16 of the base plate 11. The resetting pin 33 has a longitudinal extension that allows the resetting pin 33, when pushed in a direction towards the base plate 11 to engage the resetting surface 23 of the stopping member 12. Thereby the stopping member 12 may be moved by pivoting from its release position to its stop position.

Figure 7A:
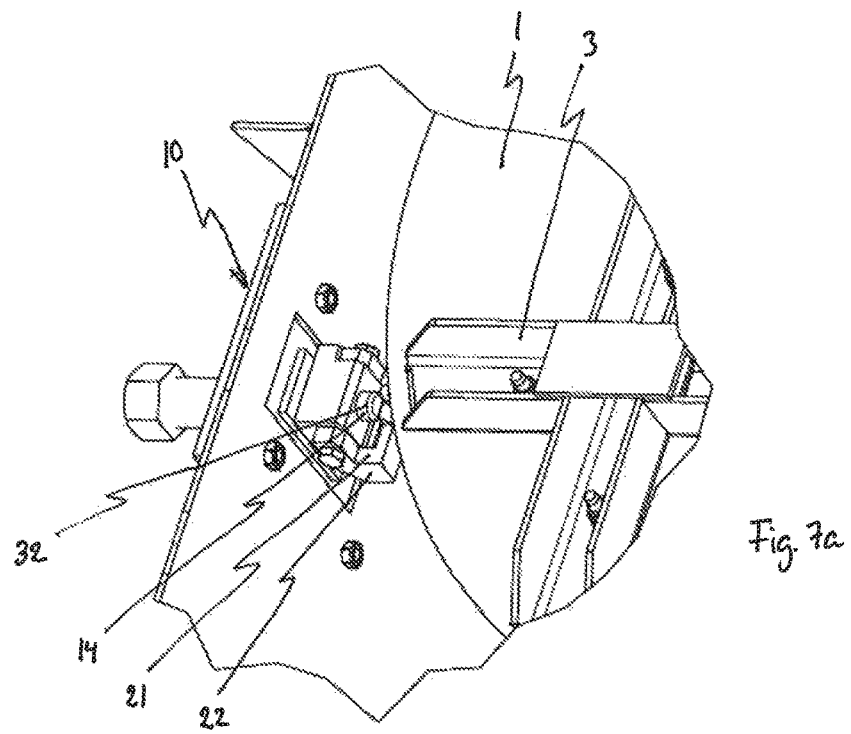
FIGS. 7a and 7b disclose the operation of the arrangement

Now turning to FIGS. 7a and 7b, the operation of the arrangement 100 with its locking device 10 will be discussed. Starting with FIG. 7a, a portion of the flap 1 with its stiffeners 3 is disclosed. This position represents a momentary position just before releasing of the locking device 10 due to a back pressure, i.e. the flap 1 has managed to compress the flexible sealing (not shown in FIGS. 7a and 7b) to such extent that the edge of the flap 1 has come into contact with and abuts the stop face 21 of the stopping member 12. Accordingly, the locking device 10 as such is in a position, immediately before being released.

In this momentary position the locking pin 14 is biased towards its locking position and the stopping member 12 has been pivoted to its stop position. Also, in this position, the locking pin 14 is biased by the elastic member 30 (not shown in FIG. 7a) so that the second end 32 of the locking pin 14 abuts the shoulder 22 of the stopping member 12.

Continuing from this position—as the pressure wave from the back pressure propagates, the flap 1 will pivot further and hit the stop face 21 with such kinetic energy that the dimensioned releasing force required to release the locking mechanism is overcome. The required releasing force is determined by a combination of friction between the locking pin 14 and the abutment surface 25 of the shoulder 22 of the stopping member 12 and also the biasing force of the locking pin 14.

Figure 7B:
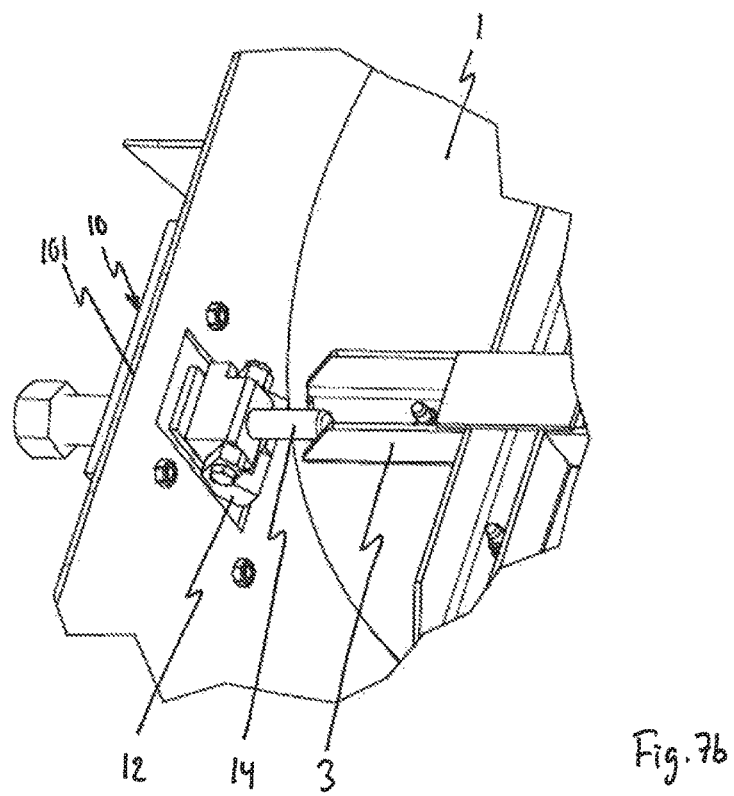

Now turning to FIG. 7b, the locking device 10 is disclosed in its released position. In order to reach this position the kinetic energy of the flap 1 has caused the stopping member 12 to pivot from its stop position to its release position, which is turn has allowed the locking pin 14, as a result of its biasing, to move from its retracted position to its locked position. The remaining kinetic energy of the pivoting of the flap 1 is absorbed by the flexible sealing (not shown in FIGS. 7a and 7b) which is further compressed. As a result, the flap 1 has reached a stand-still position in which it is held and maintained in a closed and locked position between the closed-off inlet opening and the projecting locking pin 14. Since the locking device 10 is arranged aligned with a stiffener 3 on the flap 1, the projecting portion of the locking pin 14 will engage either the stiffener 3 or the plate 4 making up the flap 1. The closing-off of the inlet opening is maintained until a resetting of the locking device 10 is actively made by an operator.

To reset the locking device 10, an operator pulls the locking pin 14 in a direction away from the housing 101. When pulling the locking pin 14, the compression of the flexible sealing will be released, whereby the flap 1 will be forced by the recovering of the flexible sealing 206 to pivot away from the inlet opening. Thus, a gap is formed between the flap 1 and the inlet opening. While maintaining the pulling of the locking pin 14, the operator pushes the resetting pin 33 towards the stopping member 12. Thereby the resetting pin 33 will engage the resetting surface 23 of the stopping member 12, pivoting the stopping member 12 to its stop position. When the stopping member 12 has been set to its stop position, the operator may release the pulling of the locking pin 14, whereby the locking pin 14, due to its biasing, will return to its locking position in which it engages the abutment surface 25 of the shoulder 22. Thereby, the locking device 10 has been reset and the arrangement 100 and the ducting 200 is ready to be used anew.

It goes without saying, that as a safety measure, the ducting 200 and the arrangement 100 with its components must be inspected after a reset to make sure that all components are in a proper condition without any undue deformations. To allow such inspection, the chamber of the ducting 200 may comprise an inspection door.

The flap 1 has been disclosed as being fixed to the shaft 5 via two struts 7. It is to be understood that the number of struts 7 may differ.

The disclosed arrangement 100 comprises four locking devices 10, i.e. two locking devices 10 on each side wall 104. It is to be understood that the number of locking devices 10 may differ depending of the overall size of the arrangement. The arrangement 100 should have at least one locking device 10.

The arrangement may be provided as an insert to be mounted adjacent a duct opening in a ducting. By providing the arrangement as an insert, the arrangement can be provided as an off-the shelf product ready to be installed in a ducting. Thereby the installation time may be reduced, and also maintenance or replacement in case the arrangement or parts thereof should have been damaged due to a back pressure.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. Back pressure flap valve arrangement comprising a housing having an inlet opening and an outlet opening adapted for connection of the housing to a ducting, and at least one side wall extending along a flow direction through the housing from the inlet opening to the outlet opening, the arrangement further comprising
   a flap which is pivotably hinged about a shaft thereby being movable between an open position and a closed position, said shaft extending transverse the flow direction, wherein
   an arrangement further comprises at least one locking device being fixedly mounted to the side wall and comprising a locking pin and a stopping member,
   said locking pin being movable between a retracted position and a locking position, and being biased towards said locking position, and
   the stopping member being movable from a stop position in which the stopping member is adapted to hold the locking pin in its retracted position, to a release position by the flap acting on the stopping member in case of a back pressure, thereby allowing the locking pin to move into the locking position in which the locking pin maintains the flap in the closed position wherein the stopping member comprises a shoulder arranged to engage the locking pin when the locking pin is held in its retracted position.

2. Back pressure flap valve arrangement according to claim 1, wherein the ducting comprises a flexible sealing arranged in a position between an inlet opening of the ducting and the flap, and wherein the flexible sealing must be at least partly compressed by the pivoting of the flap for the flap to be able to act on the stopping member.

3. Back pressure flap valve arrangement according to claim 2, wherein a radial gap is formed between the flexible sealing and the inlet opening of the ducting.

4. Back pressure flap valve arrangement according to claim 1, wherein the stopping member is movable from the stop position to the release position by the stopping member being arranged to pivot around a pivot, said pivot having a longitudinal extension essentially in parallel with the surface extension of the flap as seen in a position when the flap has pivoted to its closed position in case of a back pressure.

5. Back pressure flap valve arrangement according to claim 1, wherein the stopping member comprises a stop face having a surface extension essentially in parallel with the surface extension of the flap as seen in a position when the flap has pivoted to its closed position, and wherein the flap, in case of a back pressure, is arranged to act on said stop face thereby moving the stopping member from its stop position to its release position.

6. Back pressure flap valve arrangement according to claim 1, wherein the flap comprises at a stiffener, and wherein the locking pin is adapted to abut said stiffener in a condition when the flap has been pivoted to its closed position.

7. Back pressure flap valve arrangement according to claim 1, wherein the locking device further comprises a base plate via which the locking device is fixedly mounted to a side wall of the housing, wherein the locking pin is arranged to extend from a first side of the base plate, via a through hole in the base plate, to a second side of the base plate, and wherein the locking pin is biased towards the locking position by an elastic member being supported by the portion of the locking pin extending on the second side of the base plate.

8. Back pressure flap valve arrangement according to claim 7, wherein the locking device further comprises a resetting member, said resetting member comprising a resetting pin extending from the first side of the base plate, via a through hole in the base plate, to the second side of the base plate, and whereby the stopping member is arranged to be moved from its release position to its stop position by pushing the resetting member towards the stopping member.

9. Back pressure flap valve arrangement according to claim 8, wherein the resetting member is biased towards the first side of the base plate.

10. Back pressure flap valve arrangement according to claim 1, wherein the locking pin is arranged to be set from the locking position to the retracted position by pulling the locking pin, thereby overcoming the biasing, and while pulling the locking pin, moving the stopping member from its release position to its stop position.

11. Back pressure flap valve arrangement according to claim 1, wherein the shaft is rotatably suspended in two opposing side walls of the housing, and wherein the suspension is made via two long holes arranged in the respective side walls.

12. Back pressure flap valve arrangement according to claim 1, wherein the flap is further pivotably hinged along a pivot extending in parallel with the shaft, said pivot being arranged to extend across the surface extension of the flap.

13. Use of a back pressure flap valve arrangement according to claim 1 in a ducting intended to conduct a dust or particulate laden gas flow.

* * * * *